United States Patent [19]
Sato et al.

[11] Patent Number: 4,585,188
[45] Date of Patent: Apr. 29, 1986

[54] FISHING REEL

[75] Inventors: Jun Sato; Hideki Nakajima, both of Sakai, Japan

[73] Assignee: Shimano Industrial Company Limited, Osaka, Japan

[21] Appl. No.: 536,656

[22] Filed: Sep. 28, 1983

[30] Foreign Application Priority Data

Oct. 4, 1982 [JP] Japan .................. 57-175130

[51] Int. Cl.⁴ .......................................... A01K 89/02
[52] U.S. Cl. .................. 242/219; 242/84.52 B; 242/221
[58] Field of Search .......... 242/217, 218, 219, 220, 242/221, 211–214, 216, 84.5, 84.51, 84.52 B

[56] References Cited

U.S. PATENT DOCUMENTS

| | | | |
|---|---|---|---|
| 1,271,429 | 7/1918 | Burt | 242/84.5 R |
| 1,547,297 | 7/1925 | Case | 242/84.5 R |
| 2,162,774 | 6/1939 | Coxe | 242/212 |
| 2,204,082 | 6/1940 | Henze | 242/84.5 R |
| 2,984,432 | 5/1961 | Clark | 242/84.51 R |
| 2,984,433 | 5/1961 | Clark | 242/214 |
| 3,268,182 | 8/1966 | Clark | 242/221 |

Primary Examiner—Billy S. Taylor
Attorney, Agent, or Firm—Stevens, Davis, Miller & Mosher

[57] ABSTRACT

A fishing reel which supports a spool shaft with a spool rotatably between a pair of frames, the spool shaft being driven through a drive mechanism, and provides a clutch operating mechanism to make the spool freely rotatable. A stopper gear is provided at at least one of the spool and spool shaft and a stopper engageable with said gear to impede reverse rotation of said spool is provided at the frame. A stopper operating member is provided to be operated to disengage the stopper from the stopper gear.

3 Claims, 4 Drawing Figures

FISHING REEL

FIELD OF THE INVENTION

This invention relates to a fishing reel, and more particularly to a fishing reel which uses a spool shaft to rotatably support a spool between a pair of frames, so that a drive mechanism, having a handle, can wind up a fishing line of the spool. A clutch mechanism, controlled by a clutch operating mechanism, makes the spool freely rotatable to permit casting of the line.

BACKGROUND OF THE INVENTION

Conventionally, this type of fishing reel is called a double-bearing reel and is hitherto well-known. Generally, this kind of reel provides the clutch mechanism and clutch operating mechanism having a clutch control plate. The clutch control plate moves forwardly to disengage the clutch mechanism to make the spool shaft freely rotatable to permit casting, and moves backward to engage the clutch mechanism, thereby transmitting a driving force from the handle to the spool shaft through the clutch mechansim and drive mechanism to wind up the line onto the spool. The drive mechanism is provided with a drag mechanism having friction plates on the handle shaft and a stopper gear engageable with a stopper pivoted to the frame is provided on the handle shaft. The drag mechanism, when the clutch mechanism engages, makes the spool slidably rotatable in the reverse direction under the predetermined rotational resistance. Thus tension acting on the line when wound, allows the spool to slidably rotate in the reverse direction at the predetermined rotational resistance, whereby the line is gradually drawn from the spool under the aforesaid rotational resistance. Also, the stopper engages with the stopper gear to impede the reverse rotation of the handle shaft so as to avoid reverse rotation of the handle when the line is drawn out.

When a large hooked fish applies a large tension to the line and the drag mechanism in the reel is constructed as foregoing, the friction plate slides at the drag mechanism, even when the drag mechanisms adjusted to its largest drag, to thereby allow the spool to slidably rotate in the reverse direction. Thus, an angler intending to reel in the hooked fish with a continuous stroke, cannot do so by virture of the action of drag mechanism.

SUMMARY OF THE INVENTION

In the light of the above problem, this invention has been designed. An object of the invention is to provide a fishing reel which is capable of completely impeding the reverse rotation of the spool during the winding-up of the line through engagement of a clutch mechanism, thereby enabling a hooked fish to be reeled in at a continuous stroke. Also when the drive mechanism drives the spool, the drag mechanism enables the slidable rotation of the spool.

The fishing reel of the invention comprises a pair of frames, a spool shaft journalled thereto and having a spool, a drive mechanism having a handle and a drag mechanism and driving the spool shaft by operating the handle, a clutch mechanism which transmits a driving force from the drive mechanism engageably and disengageably to the spool shaft, and a clutch operating mechanism having a clutch operating plate and for operating the clutch mechanism engageably and disengageably.

The present invention is characterized by an anti-reverse-rotation mechanism, which has a stopper gear fixed to at least one of the spool and spool shaft, and a stopper supported to the frame and engageable with the stopper gear to impede the reverse rotation of spool. The anti-reverse-rotation mechanism is provided with a stopper operating member which allows the stopper to engage with the stopper gear when the clutch operating plate, at the clutch operating mechanism, is operated to engage the clutch mechanism. The stopper operating member also allows the stopper to disengage from the stopper gear when the clutch mechanism is disengaged.

In the above construction, the stopper operating member preferably interlocks with the clutch operating plate, by interposing an interlocking member between the stopper operating member and the clutch operating plate.

The present invention locates the stopper gear at the spool or spool shaft to directly impede the reverse rotation of the spool or spool shaft. In other words, the reverse rotation is not impeded by the drag mechanism as conventional. Hence, the spool is free from slidable rotation. Furthermore, when the drive mechanism handle is operated to drive the spool and wind up the line, the drag mechanism makes possible the slidable rotation of the spool, thereby preventing line breakage.

These and other objects of the invention will become more apparent in the detailed description and examples which follow.

DETAILED DESCRIPTION OF THE INVENTION

Figure 1:
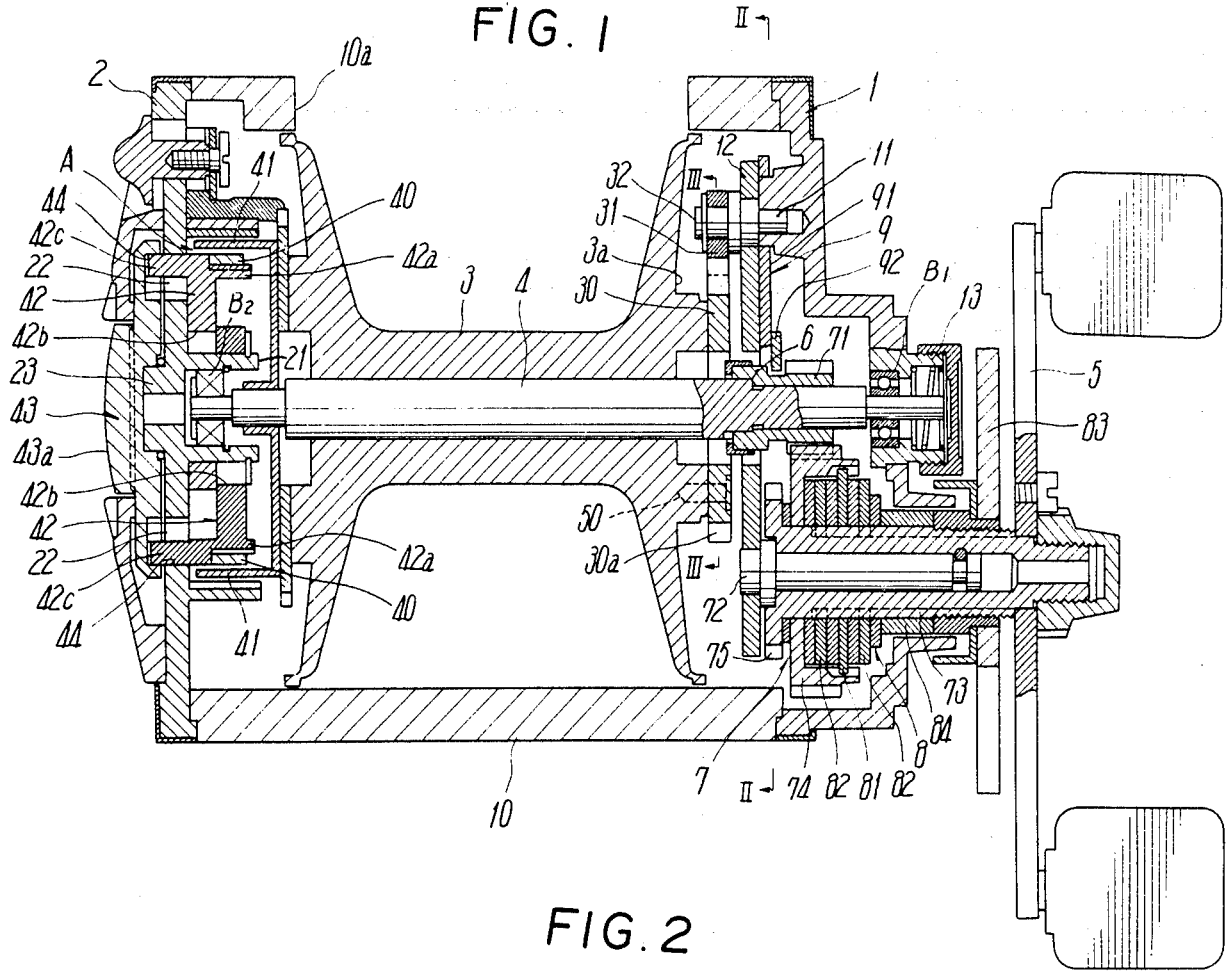
FIG. 1 is a sectional view of an embodiment of a fishing reel of the invention.

Referring to FIG. 1, reference numerals 1 and 2 designate a pair of first and second frames mounted to both ends of a cylindrical connecting member 10 open 10a at one side, the first frame 1 being cup-like-shaped and having at the open side a plate 12 fixed thereto through, for example, three stays 11 and at the central portion a support cylinder 13 carrying a bearing $B_1$, and the second frame 2 being disc-like-shaped and having at the central portion a support cylinder 21 carrying a bearing $B_2$.

A spool shaft 4 fixedly supporting a spool 3 is journalled to the first and second frames 1 and 2 through the bearings $B_1$ and $B_2$, a handle 5 is rotated to transmit a driving force to the spool shaft 4 through a drive mechanism 7 including a clutch mechanism 6 and a drag mechanism 8, thereby driving the spool 3, and a clutch operating plate 91 at a clutch operating mechanism 9 engages and disengages the clutch mechanism 6.

The clutch mechanism 6 comprises flat faces provided at an intermediate portion of spool shaft 4 and a cylinder which has a non-circular inner surface engageable with the flat faces and is provided at a pinion 71 supported rotatably and axially slidably to the spool shaft 4, the clutch operating plate 91 being operated forwardly to disengage the cylinder at pinion 71 from the flat faces to thereby make the spool shaft 4 and spool 3 freely rotatable.

Figure 2:
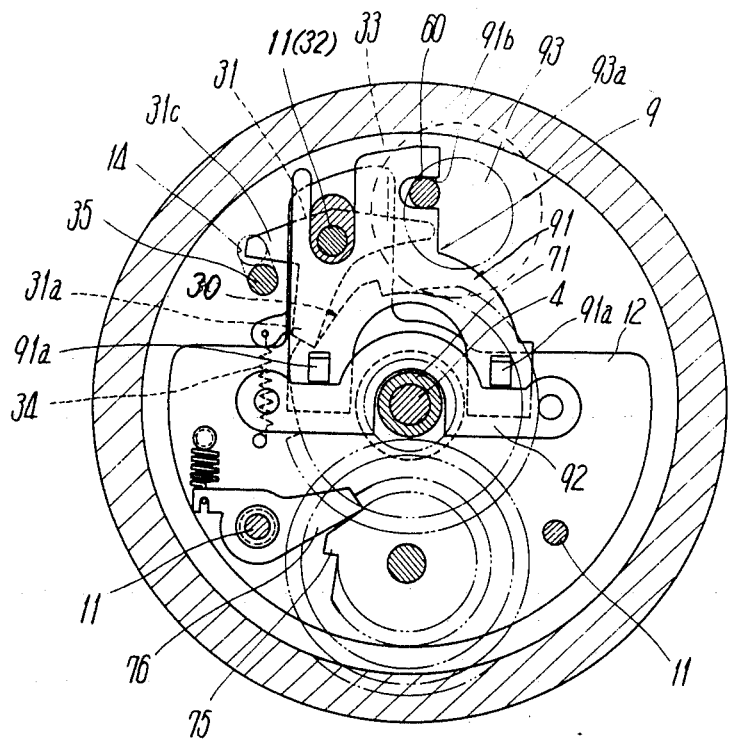
FIG. 2 is a sectional view taken on the line II—II in FIG. 1.

The drive mechanism 7 comprises the pinion 71, a handle shaft 73 supported rotatably to the fixed plate 12 through a support shaft 72, a drive gear 74 supported to part of handle shaft 73 entering the first frame 1, the drag mechanism 8, and an anti-reverse-rotation gear 75 fixed to the handle shaft 73. The driving force to drive the spool 3 is transmitted from the handle 5 to the spool shaft 4 through the drag mechanism 8, drive gear 74, pinion 71 and clutch mechanism 6 provided between the pinion 71 and the spool shaft 4. In addition, the anti-reverse-rotation gear 75, as shown in FIG. 2, always engages with an anti-reverse-rotation pawl 76 pivoted to the fixed plate 12 to thereby impede the reverse rotation of handle shaft 73, but the gear 75 and pawl 76 are not indispensable.

The drag mechanism 8 comprises a plurality of friction plates 81 supported to the handle shaft 73, a plurality of contact plates 82 abutting against the friction plates 81 respectively, a drag lever 83 interposed between the outermost contact plate 82 and the handle 5, and a washer 84 interposed between the drag lever 83 and the outermost contact plate 82. The contact plates 82 are supported to the handle shaft 73 so that the contact plates 82 may move axially but cannot rotate. The drag lever 83 screws with the handle shaft 73 and rotates to axially move the contact plates 82 in press-contact with the friction plates 81 to thereby trasmit the driving force from the handle shaft 73, to the drive gear 74, through the friction plates 81. The press-contact force of drag lever 83 with the friction plates 81 is reduced to enable the drive gear 74 to slidably rotate with respect to the handle shaft 73.

The clutch operating mechanism 9 comprises a clutch yoke 92 carrying the pinion 71 and urging it in the direction of engaging the furcated clutch mechanism 6, and a clutch operating plate 91 having an urging portion 91a for urging the clutch yoke 92. The clutch operating plate 91 is supported to the first frame 1 in relation of being reciprocable perpendicularly to the spool shaft 4, and moved forwardly to move the clutch yoke 92 axially of pinion 71, thereby moving the pinion 71 in the direction of disengaging the clutch mechanism 6, and moved backwardly to urge the pinion 71 by the clutch yoke 92 in the direction of engaging the clutch mechanism 6.

The reel of the invention constructed as the above is provided at at least one of the spool 3 and spool shaft 4 with a stopper gear 30 rotatable together with the spool 3, and at the first frame 1 with a stopper 31 engageable with the stopper gear 30 to impede the reverse rotation of spool 3. Stopper 31 pivots on a shaft 32 and the stopper 31 has an operating nose 33 which is operated by the clutch operating plate 91 in forward movement for disengaging the stopper 31 from the stopper gear 30.

Figure 3:
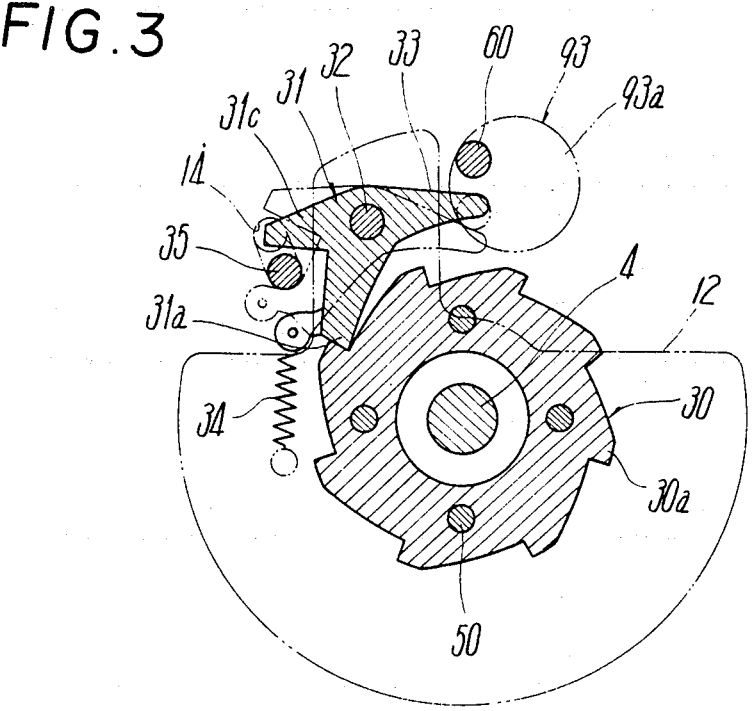
FIG. 3 is a sectional view taken on the line III—III in FIG. 1.
Figure 4:
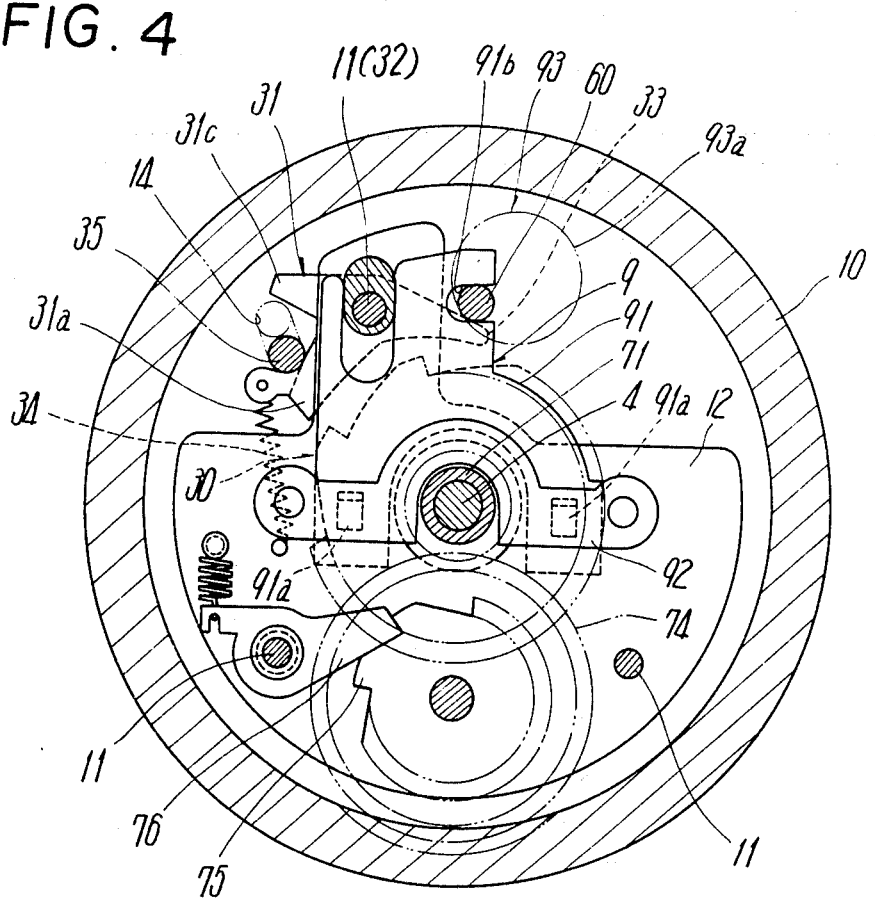
FIG. 4 is a sectional view of a clutch operating plate in condition of forward operation, corresponding to FIG. 2.

In the above construction, the stopper gear 30, as shown in FIG. 3, is circumferentially toothed 30a and disposed in a space between the spool 3 and the fixed plate 12 and fixed to the end face 3a of spool 3 at the first frame 1 side through set screws 50 or an adhesive. Alternatively, the stopper gear 30 may be integral with the spool 3, or be fixed to the spool shaft 4 at its projecting portion from the end face 3a of spool 3.

The stopper 31 comprises a pawl 31a engageable with the tooth of stopper gear 30 and is integral with the operating nose 33 so as to interlock with the clutch operating plate 91 through the interlocking member 60. In addition, the stopper operating nose 33 may alternatively be separate from the stopper 21 so as to be supported to, for example, the first frame 1 operative from the exterior, or may connect at one end with the stopper 31 and project at the other end outwardly from the first frame 1 operated from the exterior. Thus, the construction of operating nose 33 is not defined. The stopper operating nose 33 shown in the drawing interlocks with the clutch operating plate 91 and is constructed as follows:

The stopper operating nose 33 is integral with and projects from the root of stopper 31 at the pivoting side to the first frame 1, and a spring 34 for biasing the stopper 31 to engage with the stopper gear 30 is provided between the stopper 31 and the first frame 1.

The clutch operating plate 91 is operated in reciprocation by an operating member 93 supported rotatably to the first frame 1, and has a recessed engaging portion 91b at the root of plate 91 supported to the first frame 1. The operating member 93 has, for example, a round operator accessible control element 93a pivoted at the center thereof to the first frame 1 and an interlocking member 60 projecting outwardly from the eccentric position of control element 93a, the interlocking member 60 engaging with the engaging portion 91b so that the operating member 93 is rotated to operate the clutch operating plate 91. Also, the interlocking member 60 engages with the stopper operating nose 33 so that the operating member 93 is rotated to operate the stopper 31 together with the clutch operating plate 91. In addition, the operating member 93 is given a predetermined rotational resistance to enable the clutch operating plate 91 to be kept in the reciprocated position.

An interlocking mechanism of stopper 31 with the clutch operating plate 91 is so constructed that the stopper operating nose 33 is put in the operational path of interlocking member 60 at the operating member 93 to transmit an operating force to the stopper 31 through the interlocking member 60 and stopper operating nose 33. Thus, the operating member 93 is rotated counterclockwise in FIG. 2 to move the clutch operating plate 91 forwardly and operate the stopper 31 to disengage from the stopper gear 30 against the spring 34. The operating member 93 is rotated clockwise in FIG. 2 to return the clutch operating plate 91 and engage the stopper 31 with the stopper gear 30 by virtue of spring 34.

In addition, in the reel shown in the drawings, the stopper 31 has a releasing nose 31c and an elongate slot 14 is provided at the first frame 1 and slidably supports a stopper releasing element 35 engageable with the releasing nose 31c. The releasing element 35 is operated to disengage the stopper 31 from the stopper gear 30 against the spring 34. Thus, when the clutch mechanism 6 engages, the anti-reverse-rotation of spool 3, caused by the stopper 31, can be released so that the drag mechanism 8 allows the spool 3 to slidably rotate in the reverse direction. In addition, if the stopper operating nose 33 is separate from the clutch operating plate 91, the stopper releasing element 35 is not necessary.

The reel of the invention is provided between the second frame 2 and the spool shaft 4 with a magnet brake A comprising magnets 40 and an electrical conductor 41. The electrical conductor 41 is cylindrical and mounted to the spool 3 or spool shaft 4 concentrically therewith. Non-magnetic holders 42 each having a magnet holder at the outer periphery thereof 42a and at the center an elongate shaft bore 42b, are formed and the magnet 40 is held at the outer periphery 42a of each holder 42 and opposite to the inner periphery of the electrical conductor 41. The elongate shaft bores 42b are supported onto the outer surface of support cylinder 21 in relation of being movable radially outwardly thereof. Guide bores 22 for radially guiding the holders 42 are provided at the second frame 2 at the eccentric positions of the center of support cylinder 21, and engaging projections 42c provided at the sides of holders 42 are inserted into the guide bores 22 respectively. A disc-like-shaped adjuster 43 having a rotary thumbnut 43a is supported rotatably to a support 23 at the outer surface of second frame 2. The adjuster 43 has at the inner surface cam grooves 44 of circular arc and shifting circumferentially from the outer periphery to the center so that the engaging projections 42c inserted into the guide bores 22 engage with the cam grooves 44 respectively. The thumbnut 43a is exposed outwardly of second frame 2 and operative from the exterior so that the adjuster 43 is rotated to change the engaging position of each engaging projection 42c with the cam groove 44. Thus, each holder 42 moves radially with respect to support cylinder 21, and adjusts the position of magnet 40 with respect to the electrical conductor 41.

To cast a line from the spool of the fishing reel of the invention, the operating member 93 is operated to move the clutch operating plate 91 forwardly to disengage the clutch mechanism 6 and disengage the stopper 31, in interlock with the operating plate 91, from the stopper gear 30 to allow the spool 3 to freely rotate.

After casting the line, the operating member 93 moves the clutch operating plate backwards to its original position, and the clutch mechanism 6 engages to keep the line in the winding stage. The stopper 31, interlocking with the clutch operating plate 91, is actuated to engage the stopper 31 with the stopper gear 30, so the spool 3 is restrained from reverse rotation while waiting to reel in a hooked fish.

A driving force is transmitted from the handle 5 to the spool shaft 4 through the handle shaft 73, drive gear 74, pinion 71 and clutch mechanism 6, to drive the spool 3 for winding up the line.

In the stage of winding up the line, when a fish is hooked, the line is subjected to tension, thereby applying a force in the reverse direction to the spool 3, but the spool 3 is securely restrained to prevent reverse rotation, so the line is not drawn out therefrom. Hence, and even larger hooked fish can be fished up with a continuous stroke. In addition, since the drive mechanism 7 works with the drag mechanism 8, if the force of hooked fish pulling on the line is greater than the drag force of the drag mechanism 8, a slide action is created thereby even when the handle 5 is operated, which prevents breaking of the line. In this case, the spool 3 also is securely restrained from reverse rotation to prevent the line from being drawn out. Thus when the tension of line is reduced, the handle 5 rotates to further wind the line.

The drag mechanism 8 may be provided so that the stopper releasing element 35 is provided, or the stopper operating nose 33 is separate from the stopper 31. This engages the clutch mechanism 6 and engages the stopper 31 with the stopper gear 30 in the line winding. The release element 35 or operating member 31 is operated to release the stopper 31 from the stopper gear 30 and release the anti-reverse-rotation of spool 3, thereby making it possible to selectively switch the line winding stage to the drag mechanism 8 acting stage. Accordingly, an angler can reel in a hooked fish either at a stroke or use a characteristic of drag mechanism 8.

Alternatively, the clutch operating plate 91 is projected at part outwardly from the first frame 1 so that the projection is substituted for the operating member 93, or a slider or a swingable control element may be used, whereby the operating means for clutch operating plate 91 is not particularly defined. Also, the control element at the operating member 93 may be provided at the second frame 2 other than the first frame 1.

Also, the stopper 31 may be slidable and not defined in construction.

As seen from the above, the fishing reel of the invention provides the stopper gear at the spool or spool shaft and the stopper at the frame to restrain the reverse rotation of spool. Therefore even when a large fish is hooked while the clutch is engaged to wind up the line, the spool is reliably restrained from reverse rotation, thereby enabling the fishing-up at a stroke by preventing draw-out of the line.

Furthermore, at the same time that the reverse rotation of the spool caused by tension of the line in the line winding stage is reliably impeded, when the tension of the line exceeds a set load by the drag mechanism, the spool driven by the handle, is made slidably rotatable.

While a preferred embodiment of the invention has been described using specific terms, such description is for illustrative purpose only, and it is to be understood that changes and variations may be made without departing from the spirit or scope of the following claims.

What is claimed is:

1. A fishing reel comprising a pair of frames, a spool shaft having a spool supported rotatably between said frames, a drive mechanism having a handle and a drag mechanism for driving said spool shaft upon operation of said handle, a clutch mechanism which transmits a driving force from said drive mechanism to said spool shaft when engaged and for uncoupling the transmission of said driving force when disengaged, a clutch operating mechanism provided with a clutch operating plate for operating to engage and disengage said clutch mechanism, and an interlocking member which is movable together with said clutch operating plate, said reel having an anti-reverse-rotation mechanism provided with a stopper gear fixed to at least one of said spool and spool shaft and a stopper supported to said frame and engageable with said stopper gear to thereby impede reverse rotation of said spool, said anti-reverse-rotation mechanism being provided with a stopper operating member, adapted to engage with and be moved by said interlocking member, when said clutch operating plate moves in a direction of disengaging said clutch mechanism, to cause said stopper to disengage from said stopper gear when said clutch operating plate is operated to disengage said clutch mechanism, and means for moving said stopper operating member to cause said stopper to engage with said stopper gear, when said clutch operating plate is operated to engage said clutch mechanism.

2. A fishing reel according to claim 1, wherein said stopper operating member is integral with said stopper and said clutch operating mechanism has an operating member for moving said clutch operating plate, said interlocking member being connected with said operating member and engaging with and actuating said clutch operating plate, so that said stopper operating member by engaging with said interlocking member, thereby operates together with said clutch operating plate.

3. A fishing reel according to claim 1, wherein said stopper has a releasing segment and one of said frames has a stopper releasing member engageable with said releasing segment to disengage said stopper from said stopper gear.

* * * * *